(12) United States Patent
Millier et al.

(10) Patent No.: US 11,753,175 B2
(45) Date of Patent: Sep. 12, 2023

(54) ELECTRIC CONNECTION OF AN ELECTRIC MACHINE IN AN AIRCRAFT TURBOMACHINE

(71) Applicant: SAFRAN AIRCRAFT ENGINES, Paris (FR)

(72) Inventors: Vincent François Georges Millier, Moissy-Cramayel (FR); Loïc Paul Yves Guillotel, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/781,170

(22) PCT Filed: Nov. 24, 2020

(86) PCT No.: PCT/FR2020/052156
§ 371 (c)(1),
(2) Date: May 31, 2022

(87) PCT Pub. No.: WO2021/111058
PCT Pub. Date: Jun. 10, 2021

(65) Prior Publication Data
US 2023/0002066 A1 Jan. 5, 2023

(30) Foreign Application Priority Data
Dec. 3, 2019 (FR) ...................................... 1913669

(51) Int. Cl.
*B64D 27/24* (2006.01)
*B64D 29/00* (2006.01)
(Continued)

(52) U.S. Cl.
CPC ............. *B64D 27/24* (2013.01); *B64D 29/00* (2013.01); *F01D 15/02* (2013.01); *H02K 7/1823* (2013.01); *B64D 2027/026* (2013.01)

(58) Field of Classification Search
CPC .. B64D 27/24; B64D 29/00; B64D 2027/026; F01D 15/02; F01D 15/10; F01D 9/065;
(Continued)

(56) References Cited

U.S. PATENT DOCUMENTS

2004/0070211 A1* 4/2004 Franchet ................... F02C 7/32
290/31
2008/0174194 A1* 7/2008 Qu .......................... H02K 21/12
290/52
(Continued)

FOREIGN PATENT DOCUMENTS

EP 3 246 528 A1 11/2017
EP 3 412 575 A1 12/2018
(Continued)

OTHER PUBLICATIONS

International Search Report dated Jan. 19, 2021, issued in corresponding International Application No. PCT/FR2020/052156, filed Nov. 24, 2020, 6 pages.
(Continued)

*Primary Examiner* — Hoang M Nguyen
(74) *Attorney, Agent, or Firm* — CHRISTENSEN O'CONNOR JOHNSON KINDNESS PLLC

(57) ABSTRACT

An aircraft turbine engine includes a gas generator having a longitudinal axis (A), a fan which is located at an upstream end of the gas generator and which is configured to rotate about the axis, and an electric machine which has a generally annular shape. The electric machine is mounted coaxially downstream of the fan and has a rotor which is coupled in terms of rotation to the fan, and a stator which is connected to an electronic power circuit by at least one rigid electroconductive bar.

11 Claims, 9 Drawing Sheets

(51) Int. Cl.
  *F01D 15/02* (2006.01)
  *H02K 7/18* (2006.01)
  *B64D 27/02* (2006.01)

(58) Field of Classification Search
  CPC .............. H02K 7/1823; F05D 2220/76; F05D 2250/75; Y02T 50/60; F02K 3/06
  See application file for complete search history.

(56) References Cited

U.S. PATENT DOCUMENTS

2017/0298830 A1* 10/2017 Ertas ....................... F01D 25/22
2018/0354635 A1* 12/2018 Wagner ................... F02C 6/206
2021/0108597 A1* 4/2021 Ostdiek ................. B64D 27/10

FOREIGN PATENT DOCUMENTS

| FR | 2 842 565 A1 | 1/2004 |
| FR | 2 896 537 A1 | 7/2007 |
| FR | 2 922 265 A1 | 4/2009 |

OTHER PUBLICATIONS

Written Opinion dated Jan. 19, 2021, issued in corresponding International Application No. PCT/FR2020/052156, filed Nov. 24, 2020, 5 pages.
English translation of Written Opinion dated Jan. 10, 2021, issued in corresponding International Application No. PCT/FR2020/052156, filed Nov. 24, 2020, 4 pages.
International Preliminary Report on Patentability dated May 17, 2022, issued in corresponding International Application No. PCT/FR2020/052156, filed Nov. 24, 2020, 6 pages.

* cited by examiner

ELECTRIC CONNECTION OF AN ELECTRIC MACHINE IN AN AIRCRAFT TURBOMACHINE

TECHNICAL FIELD OF THE INVENTION

The present invention relates to an aircraft turbomachine equipped with an electric machine as well as a method for maintaining this turbomachine.

TECHNICAL BACKGROUND

The prior art comprises in particular the documents FR-A1-2 842 565, FR-A1-2 896 537 and FR-A1-2 922 265, which describe turbomachines equipped with electric machines.

The aeronautical world is now asking many questions about the relevance of using hybrid engines for commercial aviation. The use of electrical energy is now considered not only to meet the functions of the aircraft but also to electrify the functions of the turbomachine.

This observation leads to the study of hybrid engine architecture solutions, combining fossil energy of the fuel and electrical energy to ensure the driving of the propulsion portion (fan of the turbomachine) and the feeding of certain engine and/or aircraft functions.

These architectures can in particular be based on a high bypass ratio and reducer type architecture, but also on a multiple body architecture (2 or 3). In these architectures, the turbomachine comprises a low-pressure body and a high-pressure body, each body comprising a shaft connecting a rotor of a compressor to a rotor of a turbine.

It is known to equip an aircraft turbomachine with an electric machine. We recall that an electric machine is an electromechanical device based on the electromagnetism allowing the conversion of electrical energy into work or mechanical energy for example. This process is reversible and can be used to produce electricity.

Thus, depending on the final use of a machine, we use the terms of:
 generator to designate an electric machine producing electrical energy from a mechanical energy,
 motor for an electric machine producing a mechanical energy from an electrical energy.

An electric machine can also behave in motor mode as well as in generator mode.

The integration of a high-power electric machine on the low-pressure body of a turbomachine, in particular of the high bypass ratio type, is very complex. Several installation areas are possible but the advantages and the disadvantages of each are numerous and diverse (problem of mechanical integration of the machine, temperature resistance of the machine, accessibility of the machine, etc.).

One solution to this problem would be to integrate the electric machine directly downstream of the fan of the turbomachine. However, one difficulty would be the connection of this machine to the power electronic circuit which is usually located at a distance from the machine.

The use of power harnesses would pose some technical problems in this environment. The large diameter harnesses have very large bending radii, which would not be compatible with this environment. The integration of harnesses would require supports to limit the transmission of vibrations to the surrounding parts and their damage.

The present invention proposes a solution to at least some of the problems discussed above.

SUMMARY OF THE INVENTION

The invention proposes an aircraft turbomachine, comprising:
 a gas generator having a longitudinal axis,
 a fan located at an upstream end of the gas generator and configured to rotate about said axis, and
 an electric machine of generally annular shape which is mounted coaxially downstream of the fan, and which comprises a rotor rotatably coupled to the fan and a stator,
 the fan being configured to generate a main gas flow, a portion of which flows into a primary annular duct of the gas generator to form a primary flow, and another portion of which flows around the gas generator to form a secondary flow,
 the primary duct being delimited by a first and a second annular envelopes coaxial with the gas generator, the primary duct being passed through by arms, referred to as IGV arms, for connecting the first and second envelopes, as well as by tubular arms of an inlet casing located downstream of the IGV arms,
 the gas generator comprising a third annular envelope which coaxially surrounds the second envelope, the second and third envelopes being connected together at their upstream ends to form an annular splitter nose for separating the primary and secondary flows,
 characterised in that the stator of the electric machine is connected to a power electronic circuit by at least one rigid electroconductive bar, this bar comprising a first portion extending substantially radially with respect to said axis inside one of the IGV arms, and a second portion extending substantially parallel to said axis between the second and third envelopes.

The present invention thus proposes a solution for the integration of an electric machine, a first advantage being linked to the fact that in the integration area of this machine, ideally directly downstream of the fan and thus upstream of the compressor or the compressors, the temperatures prevailing there are relatively low and thus optimal for this machine. The rotor of the machine is driven by the fan and is therefore at a relatively low speed, in particular if the turbomachine comprises a reducer. In addition, the machine is located as close as possible to the flow ducts of the flows and has a relatively large diameter and can therefore produce significant power compared to the machines of the prior technologies.

Furthermore, the present invention provides a solution to the problem of electric connection of the machine in this environment. This connection is ensured by one or more rigid bars which each run through an IGV arm, i.e. as close as possible to the splitter nose of the primary and secondary flows of the turbomachine.

The turbomachine according to the invention may comprise one or more of the following characteristics, taken in isolation from each other, or in combination with each other:
 the bar is generally L-shaped, said first and second portions being substantially straight and connected together by a junction located directly downstream of said splitter nose;
 the bar has a polygonal and constant cross-section, and can be twisted;

the turbomachine comprises a nacelle casing that surrounds the gas generator, as well as bladings, referred to as OGV, for connecting the nacelle casing to said third annular envelope;

the nacelle casing defines a secondary flow duct of the secondary flow around the gas generator;

the OGV are located downstream of the IGV arms and substantially in line with the tubular arms of the inlet casing;

said second portion extends substantially in line with one of the OGV;

the gas generator comprises annular flanges for attaching the OGV which are located between said second and third envelopes and which comprise notches for the passage of said second portion of the bar;

the bar is surrounded by an insulating sheath and comprises a first end exposed for releasable attachment to an element for electric connection to said stator, and a second end exposed for releasable attachment to a harness for electric connection to said circuit;

the electric machine is located upstream of said splitter nose;

the stator of the electric machine is connected to the power electronic circuit by a plurality of rigid electroconductive bars regularly distributed around said axis;

the IGV arm through which the bar passes is tubular and oversized compared to the other IGV arms;

said power circuit is located between the second and third envelopes; said harness has a core whose cross-section is identical to the cross-section of a body of the bar;

the cross-section of the bar, and in particular of its body, is constant along the entire length of the bar.

The present invention further relates to a method for maintaining a turbomachine as described above, comprising the steps consisting in:

disassembling and removing at least one portion of the third envelope, in particular at the level of said bar, disassembling and removing the OGV located in line with this bar, and disassembling and removing the bar for maintenance.

BRIEF DESCRIPTION OF FIGURES

The invention will be better understood and further details, characteristics and advantages of the invention will become apparent from the following description made by way of non-limiting example with reference to the attached drawings, in which.

DETAILED DESCRIPTION OF THE INVENTION

Figure 1:
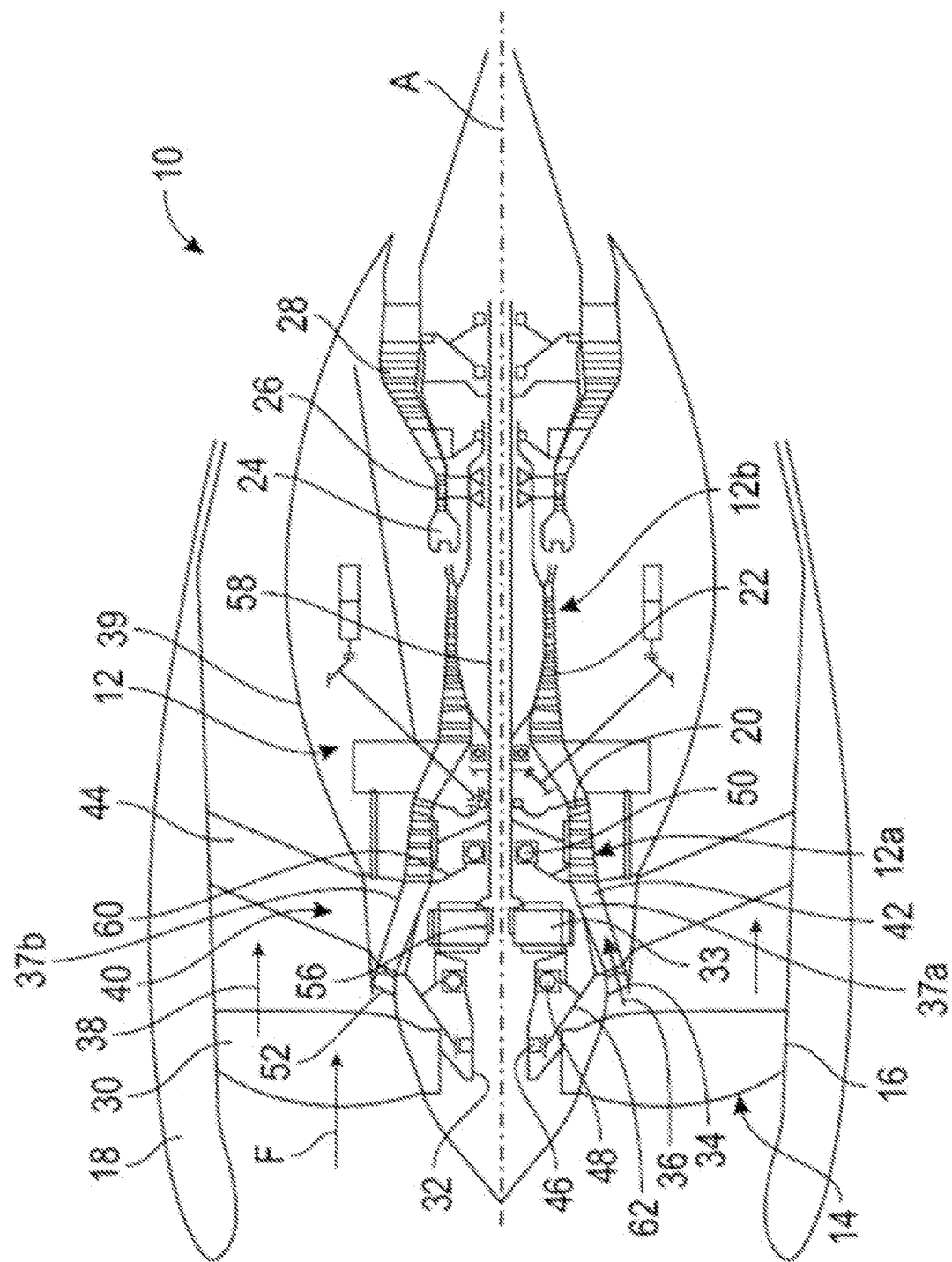
FIG. 1 is a schematic view in axial cross-section of an aircraft turbomachine with a high bypass ratio and reducer.

First, reference is made to FIG. 1, which schematically represents a double-body and double-flow aircraft turbomachine 10.

The turbomachine 10 conventionally comprises a gas generator 12, upstream of which is arranged a fan 14. The fan 14 is surrounded by a casing 16 which is surrounded by a nacelle 18 that extends around and along a major portion of the gas generator 12.

The gas generator 12 here comprises two bodies, namely a low-pressure body 12a or LP and a high-pressure body 12b or HP. Each body comprises a compressor and a turbine.

The terms "upstream" and "downstream" are considered along a main direction F of flow of the gases in the turbomachine 10, this direction F being parallel to the longitudinal axis A of the turbomachine.

From upstream to downstream, the gas generator 12 comprises a low-pressure compressor 20, a high-pressure compressor 22, a combustion chamber 24, a high-pressure turbine 26 and a low-pressure turbine 28.

The fan 14 comprises an annular row of vanes 30 driven in rotation by a fan shaft 32 which is connected to the rotor of the low-pressure body 12a by means of a reducer 33. The gas flow passing through the fan (arrow F) is separated upstream of the gas generator 12 by an annular splitter nose 34 into a radially internal annular flow, referred to as primary flow 36 that flows in a primary annular duct of the gas generator 12, and a radially external annular flow, referred to as secondary flow 38 that flows in a secondary annular duct between the gas generator 12 and the nacelle 18 and provides most of the thrust for the turbomachine.

An inlet casing 40 structurally connects the gas generator 12 to the casing 16 and to the nacelle 18. The inlet casing 40 comprises an annular row of radially internal arms 42 extending into the flow duct of the primary flow 36, and an annular row of radially external straightener bladings 44, referred to as OGV (acronym for Outer Gear Vane), extending into the flow duct of the secondary flow 38.

The arms 42 are generally limited in number (less than ten) and are tubular and crossed by auxiliaries. These arms 42 have a structural role because they allow the transmission of forces between the bearing supports and the suspensions. They also have a role of passage of the auxiliaries, allowing to make pass the auxiliaries through the duct by fairing them, thus limiting the aerodynamic losses in the duct. These arms do not have a flow straightening function because they have no camber and are not sufficient in number to carry out this function.

The number of straightener bladings 44 (OGV) is generally higher than ten. They allow to straighten the flow of the fan thanks to a specific number and camber. They also have a structural function because they support the casing around the fan (fan casing).

The flow duct of the primary flow 36 is further crossed by other straightener bladings 52, referred to as IGV (acronym for Inner Gear Vane). The IGV 52 are evenly distributed around the axis A and are located upstream of the inlet casing 40 and more precisely upstream of the arms 42. These bladings allow to straighten the flow coming from the fan when it enters the primary duct. They do not have a structural role. They are in sufficient number (for example more than 10) and with a certain camber to straighten the flow of the fan penetrating the primary duct.

The flow duct of the primary flow 36 is delimited by two coaxial annular envelopes, respectively internal 37a and external 37b. In particular, the IGV 52 and the arms 42 are connected to these envelopes 37a, 37b. The flow duct of the secondary flow 38 is delimited internally by an annular envelope 39 coaxial with the envelopes 37a, 37b, and externally by the nacelle casing 16. The OGV 44 are connected to the envelopes 37b, 39.

Each of the envelopes 37a, 37b, 39 may be formed by several adjacent walls or covers.

The rotor of the low-pressure body 12a as well as the fan shaft 32 are guided upstream by bearings 46, 48 and 50. These bearings 46, 48, 50 are of the ball or roller type and each comprise an internal ring mounted on the shaft to be guided, an external ring carried by an annular bearing support and a rolling bearing between the rings.

In a known manner, the reducer 33 is of the epicyclic gear train type and comprises a sun gear centred on the axis A, a ring gear extending around the axis, and planet gears that mesh with the sun gear and the ring gear and are carried by a planet carrier.

In the example shown, the ring gear is stationary and fixedly connected to a support 62 of the bearings 46, 48. The planet carrier is rotatable and coupled to the fan shaft 32. The sun gear of the reducer is coupled by an input shaft 56 to the main shaft 58 of the low-pressure body.

The input shaft 56 is guided by the bearing 50 which is carried by a bearing support 60. The fan shaft 32 is guided by the bearings 46, 48.

The bearing supports 60, 62 extend around the axis A and are stationary parts connected to the stator and in particular to the inlet casing 40.

Figure 2:
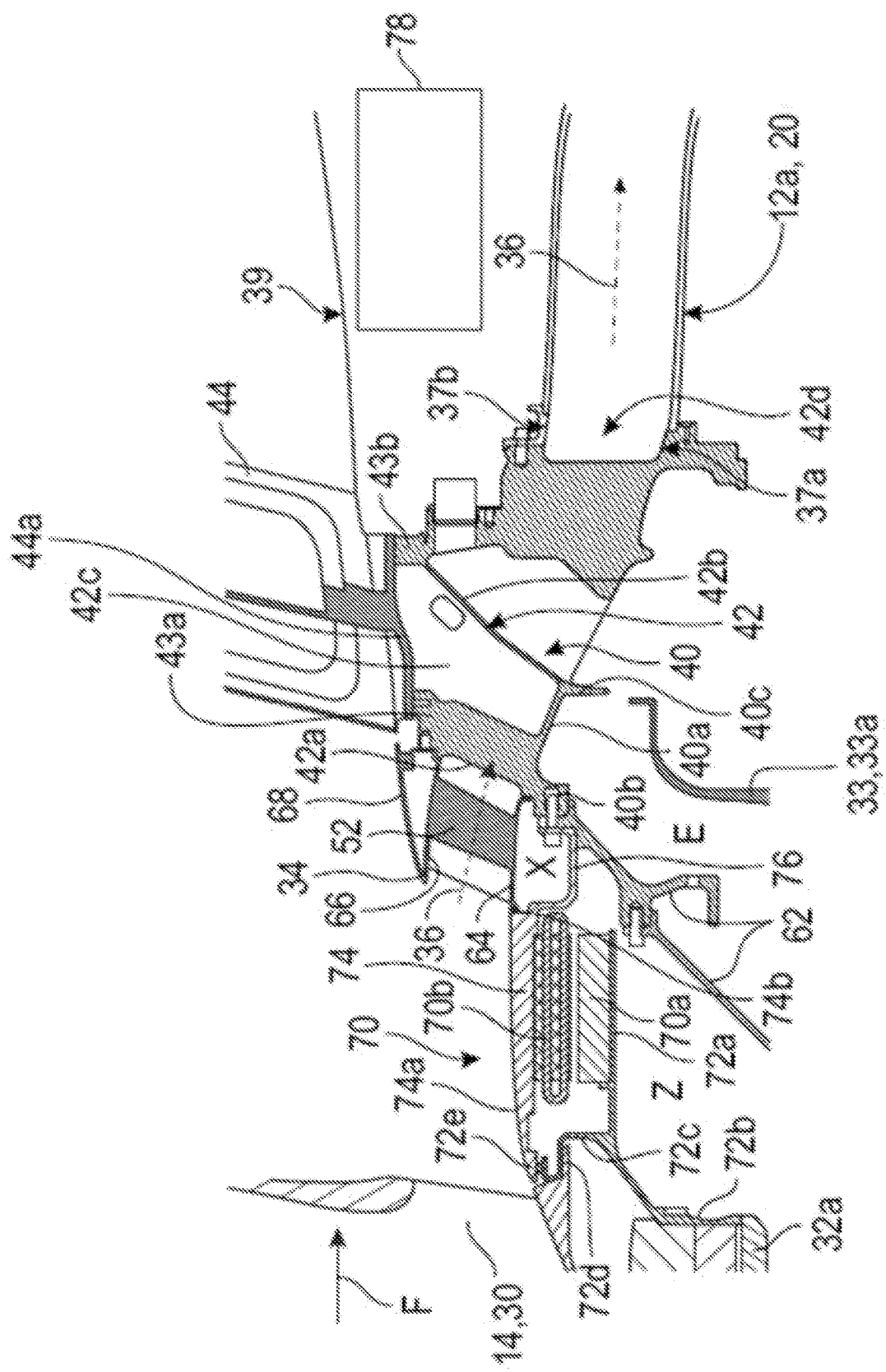
FIG. 2 is a partial schematic half-view in axial cross-section of an aircraft turbomachine according to the invention equipped with an electric machine.

FIG. 2 is a larger scale, more detailed view of a portion of FIG. 1, and illustrates an embodiment of a turbomachine according to the invention.

The elements of FIG. 2 that have already been described with reference to FIG. 1 are designated by the same references.

In particular, FIG. 2 shows the area Z between the fan disc 32a and the reducer 33, in which an electric machine 70 is installed. Only one support 33a of the ring gear of the reducer 33 is visible in FIG. 2, this element being connected, for example, to the inlet casing 40 or to the bearing support 62.

The cross-section in the drawing in FIG. 2 passes through one of the IGV 52, which may be full. As will be described in more detail in the following, however, at least one or some IGV 52 are tubular. This or these specific IGV is designated by the reference 52a. The goal of this IGV 52a is to make a fairing that limits aerodynamic disturbances and that interacts with the other IGV 52 to make a straightener.

The cross-section passes through an OGV 44 as well as through an arm 42 which is tubular for the passage of auxiliaries, as mentioned above. Each arm 42 comprises upstream an edge 42a and downstream an edge 42d, respectively leading edge and trailing edge of the primary flow 36.

Each arm 42 comprises an internal cavity 42c that is closed radially outward by a wall 44a of the OGV 44. This wall 44a is formed in one part with the OGV 44 and is attached to annular flanges, respectively upstream 43a and downstream 43b, of the inlet casing 40. The cavity 42c is isolated from the auxiliaries by the wall 42b.

The internal cavity 42c of each arm 42 is closed radially inward by an annular wall 40a of the inlet casing 40. At the upstream end of this wall 40a, the inlet casing 40 comprises a radially internal annular flange 40b for attachment of the bearing support 62. At the downstream end of the wall 40a, the inlet casing 40 comprises a radially internal annular attachment flange 40c, for example for attaching an annular gutter for recovering oil sprayed by the reducer 33 by centrifuging.

The reducer 33 as well as the bearings 46, 48, 50 visible in FIG. 1 are located in an annular lubrication enclosure E which is delimited upstream by the bearing support 62 and at least one non-visible seal, and downstream by the bearing support 60 and at least one non-visible seal. The external periphery of the enclosure E is sealed in particular by the wall 40a.

FIG. 2 allows to show that the envelope 37a mentioned above is formed of several successive walls such as the wall 40a and an annular shroud 64 located upstream of the wall 40a and connected to the internal periphery of the IGV 52.

The envelope 37b is formed by several successive walls and in particular an annular shroud 66 located upstream of the inlet casing 40. This shroud 66 extends around the shroud 64 and is connected to the external periphery of the IGV 52.

The envelope 39 is formed of several successive walls such as the wall 44a and an annular shroud 68 located upstream of the wall 44a. This shroud 68 extends around the shroud 66 and the upstream ends of the shrouds 66, 68 are connected together to form the splitter nose 34.

As discussed above, the electric machine 70 is located in an annular area Z, this area Z being delimited here upstream by the fan 14, and in particular the disc 32 for connecting the fan vanes 30 to the fan shaft 32, and downstream by the bearing support 62.

The machine 70 is generally annular in shape and comprises a rotor 70a and a stator 70b. The rotor 70a has a generally annular shape extending about the axis A and is carried by a support element 72 which itself has a generally annular shape.

In the example shown, the support element 72 comprises a cylindrical wall 72a surrounded by the rotor 70a and attached to the internal periphery of the latter. The upstream end of this wall 72a is connected on the one hand to a radially internal annular flange 72b for attachment to the fan disc 32a, and on the other hand, to an external annular rim 72c.

The rim 72c comprises an internal cylindrical surface 72d bearing on an external cylindrical surface of the fan 14 so as to ensure the centring of the rotor 70a. The rim 72c further comprises external annular wipers 72e of a labyrinth type seal.

The stator 70b is also generally annular in shape and is carried by an annular support element 74.

The element 74 comprises an external annular surface 74a which internally defines the flow duct of the gas flow F, between the fan 14 and the splitter nose 34. The element 74 is attached to the external periphery of the stator 70b and comprises an upstream end that cooperates, for example by means of an abradable annular coating, with the aforementioned wipers 72e.

The downstream end of the element 74 is axially aligned with the shroud 64, an upstream peripheral edge of which is axially engaged in an annular gorge 74b of the element 74. This gorge 74b is oriented axially downstream. The engagement of the upstream edge of the shroud 64 in the gorge 74b of the element 74 ensures an overlap and thus avoids a march in the duct which would disturb the flow F.

The downstream end of the element 74 further comprises an annular flange 76 for attaching to the bearing support 62 or to the inlet casing 40. This flange 76 is generally U-shaped in axial cross-section with the opening oriented radially outward. This flange 76 thus defines an annular space X which serves for the electric connection of the stator 70b, as will be described in more detail in the following with reference to FIG. 3 in particular. In the example shown, the flange 76 is attached by screws to a flange of the bearing support 62 and to the flange 40b of the inlet casing.

The element 74 may be formed of a single part, or of two annular and coaxial parts mounted around each other.

One of the particularities of this installation lies in the fact that the electric machine 70 and in particular its stator 70b is located as close as possible to the main flow F after passing through the fan 14. This allows on the one hand to have an electric machine with a large diameter and thus with a higher potential power than the technologies proposed so far, and on the other hand to have a machine which is cooled by the flow F. Advantageously, the thermal rejections of the electric machine are dissipated by this cooling.

For this purpose, the surface 74a swept by the flow F preferably has an aerodynamic profile, as shown in the drawing. The element 74 ensures the heat exchange by thermal conduction between the stator 70b and the flow F.

The stator 70b is connected by electric connection means to a power electronic circuit 78 which is located between the two envelopes 37b, 39 and thus around the gas generator 12.

Figure 3:
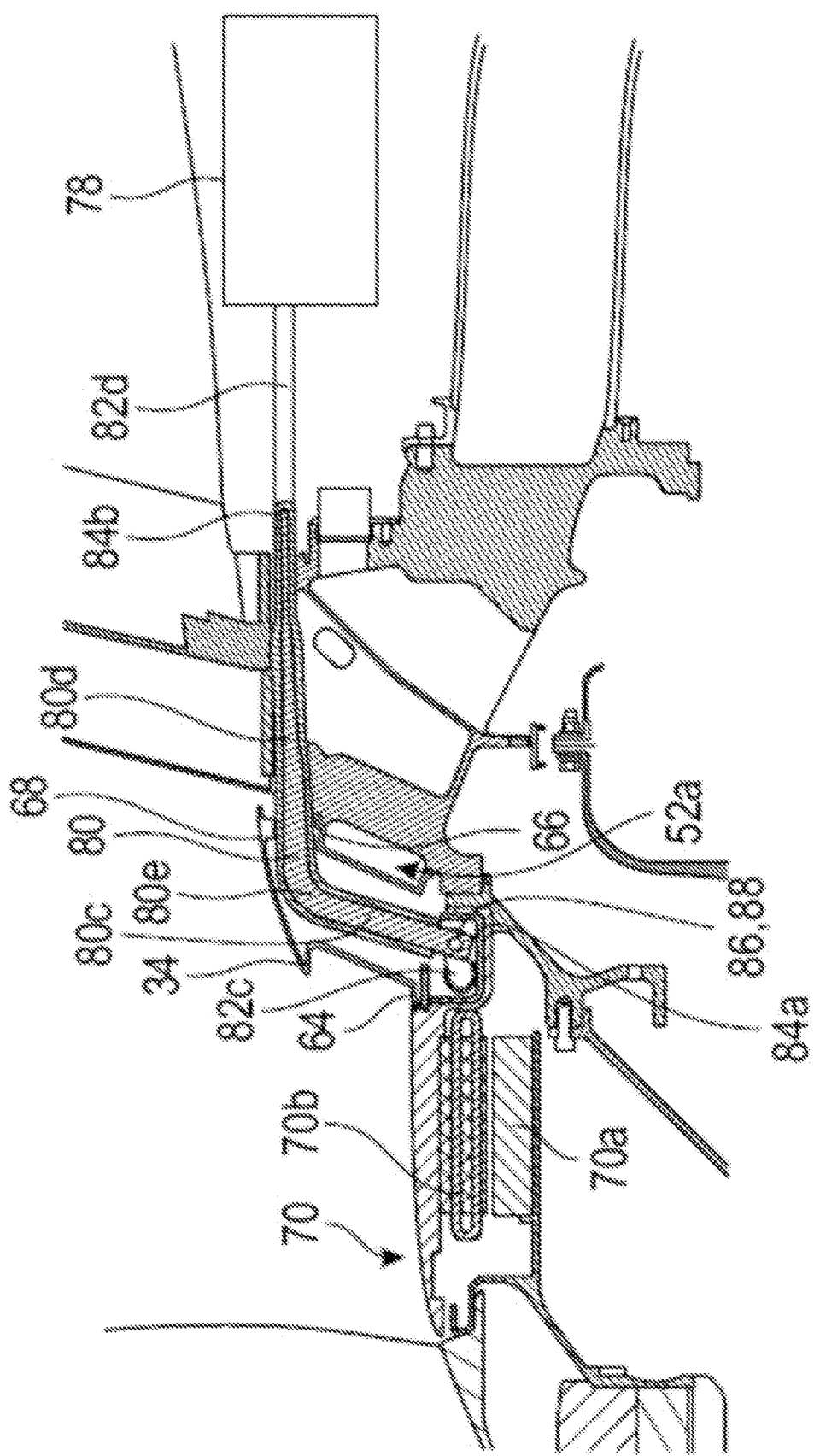
FIG. 3 is similar to FIG. 2 and shows an electric connection bar from a stator of the machine to a power electronic circuit.
Figure 4:
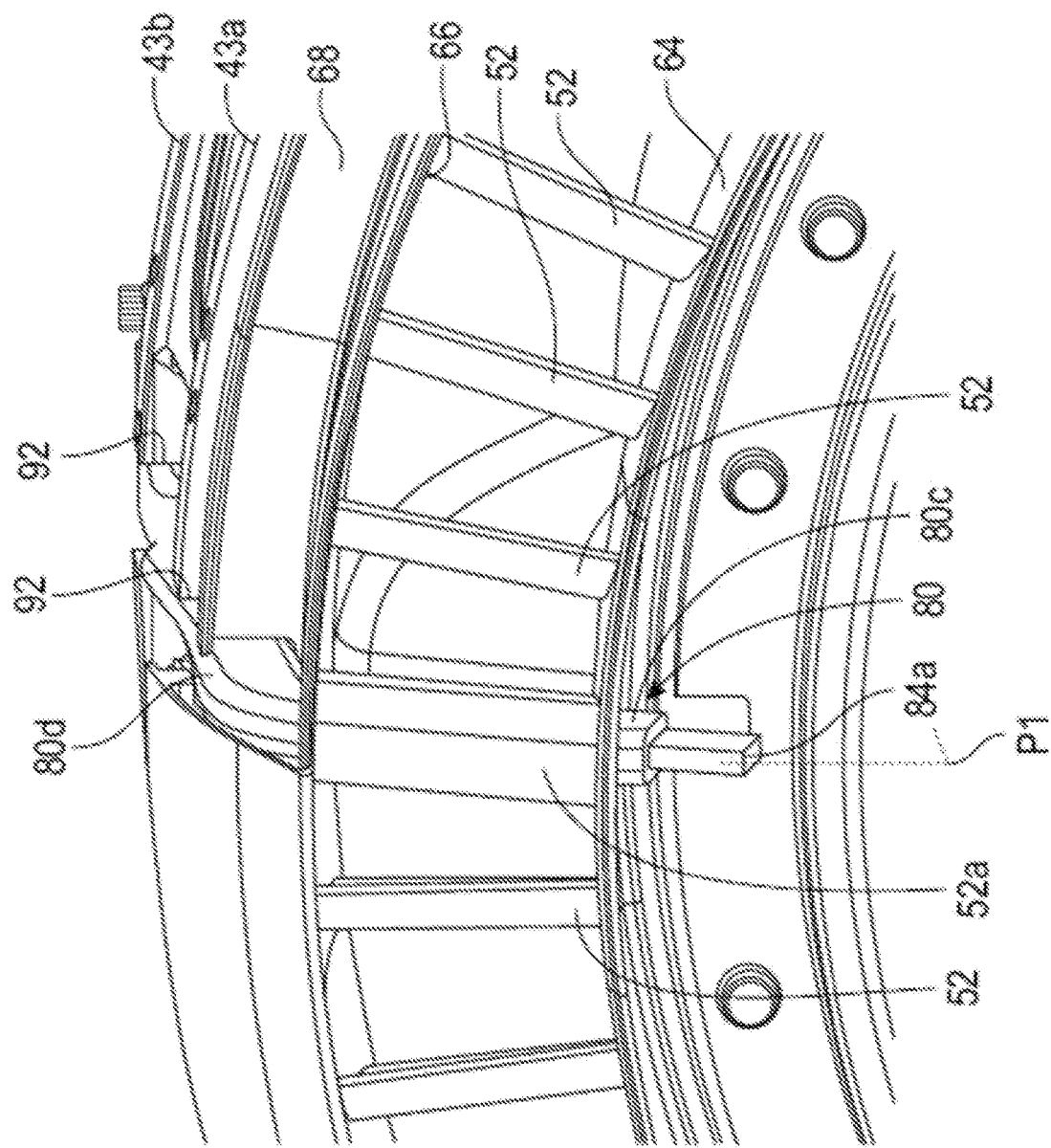
FIG. 4 is a schematic perspective view of a portion of the turbomachine of FIG. 2 and shows in particular the IGV arms, one of which is used for the passage of the electric connection bar.
Figure 5:
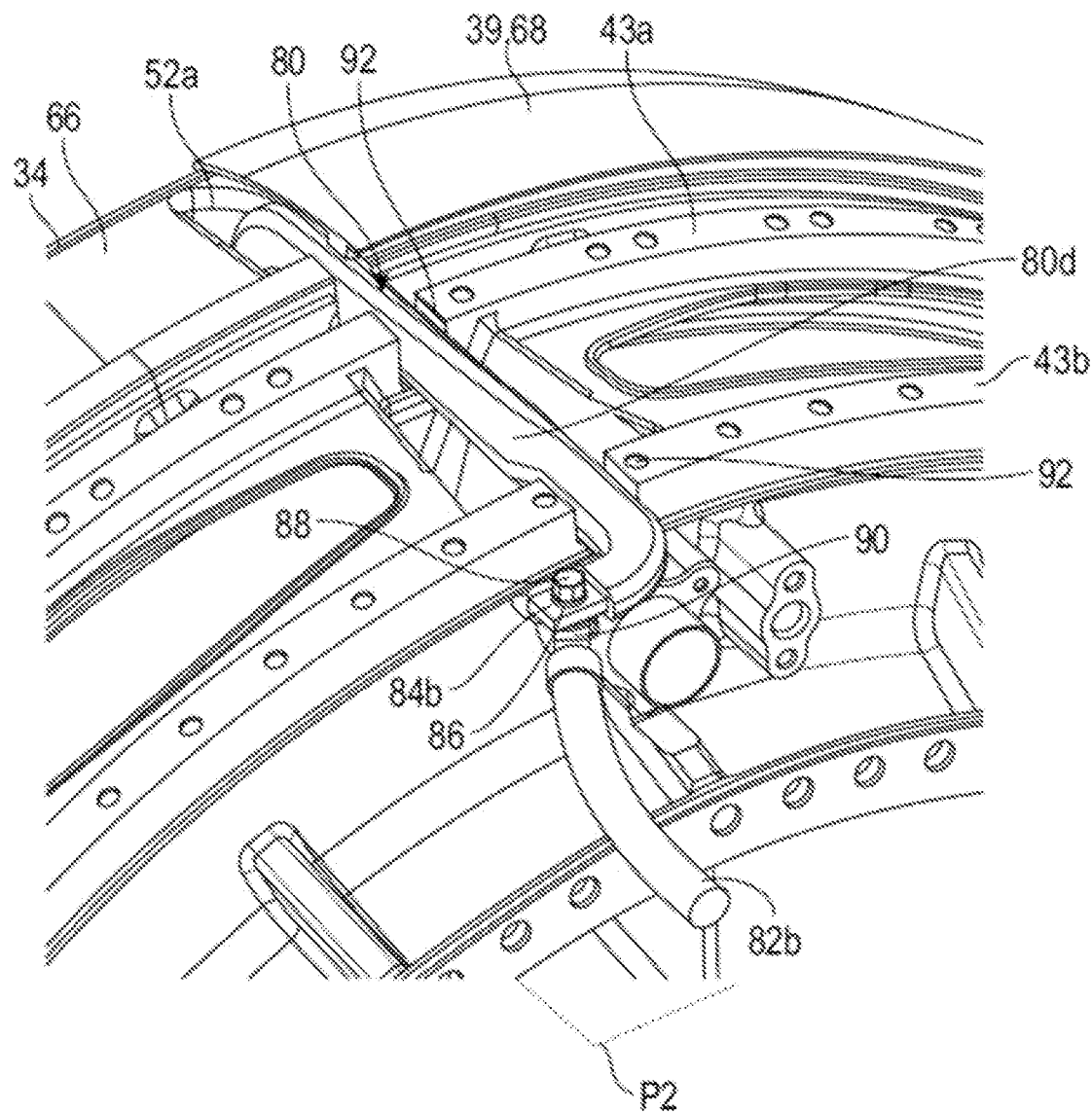
FIG. 5 is another schematic perspective view of a portion of the turbomachine of FIG. 2 and shows in particular the path of the electric connection bar.

FIGS. 3 to 5 illustrate an embodiment of these electric connection means which comprise a rigid bar 80.

Although one or more electric harnesses may additionally be used for the electric connection of the stator 70b, at least one rigid bar 80 is used, which provides many advantages.

In a preferred embodiment of the invention, the stator 70b is connected by a first electric harness 82c to one end of the bar 80, the opposite end of which is connected by a second electric harness 82d to the circuit 78. In this case, the cross-section of the core 82a of each harness 82c, 82d is preferably identical or close to the cross-section of the body 80a of the bar 80. The cross-section of the bar 80 and in particular of its body 80a is preferably constant over the entire length of the bar.

Figure 7:
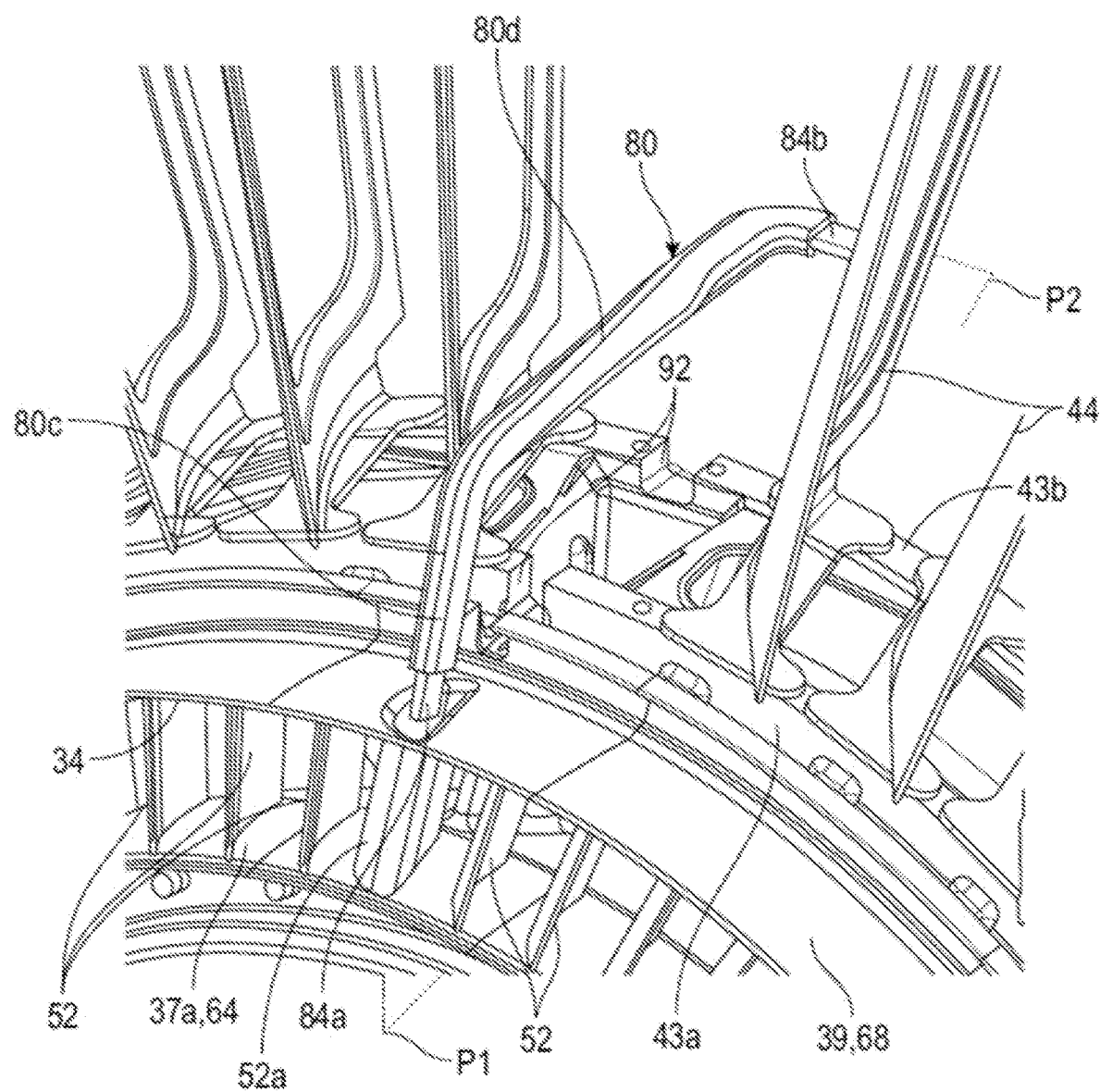
FIG. 7 is a schematic perspective view of a portion of the turbomachine in FIG. 2 and illustrates one of the steps of the method for maintaining the turbomachine.

The bar 80, visible in its entirety in FIG. 7, is shaped to run from the area Z to the circuit 78. It can have a complex general shape such as L, S, Z, etc.

The bar 80 comprises ends, respectively upstream 84a and downstream 84b, which are exposed, i.e. not covered by the sheath 80b, in order to be able to connect the bar 80 to the harnesses 82c, 82d (FIGS. 4, 5 and 7).

Each of its ends 84a, 84b comprises an orifice 86 for mounting a bolt 88 (screw and nut, or even washer). This bolt 88 is used to attach an end 84a, 84b of the bar 80 to the corresponding harness 82c, 82d, preferably by means of a lug 90. The lug is connected to one end of the harness and comprises a plate intended to be applied on the corresponding end 84a, 84b and to be tightened and attached there by means of the bolt 88 (FIG. 5).

The bar 80 can be twisted, as in the example shown (FIG. 7), the bar then comprising one of its ends 84a which extends in a plane P1 (the plane P1 in FIG. 4 passes through the axis A of the turbomachine) and the other of its ends 84b which extends in a plane P2 perpendicular to the plane P1 (the plane P2 is substantially tangent to a circumference centred on the axis A—FIGS. 5 and 7).

The invention proposes a particular path for the bar 80 from the stator 70b to the circuit 78, and more particularly between the harnesses 82c, 82d. Note that in practice, the stator 70b may be connected by several bars 80 to the circuit 78. These bars 80 are then preferably evenly distributed around the axis A and each connected by harnesses 82c, 82d to the stator 70b and to the circuit 78. The following description of a bar 80 is therefore applicable to each electric connection bar of the stator of the electric machine to the power electronic circuit.

In the embodiment shown in FIGS. 3 to 8, the bar 80 runs through one of the IGV 52, which is tubular, and then along the axis A and an OGV 44.

The bar 80 is thus generally L-shaped and comprises a first portion 80c extending substantially radially with respect to the axis A within the IGV 52, and a second portion 80b extending substantially parallel to the axis A between the envelopes 37b, 39, and substantially in line with the aforementioned OGV 44.

The portions 80c, 80d are substantially straight and connected to each other by a bent junction 80e located directly downstream of the splitter nose 34, between the shrouds 66, 68. To the extent that, as in the example shown, the IGV 52 may be inclined outwardly from upstream to downstream, the first portion 80c may have a similar inclination.

FIG. 3 allows to see that the end 84a is located in the aforementioned space X and connected by the bolt 88 to the harness 82c in this space X. It is thus understood that the bar 80 and in particular its portion 80c passes through the shroud 64 and then runs through the IGV 52.

Figure 8:
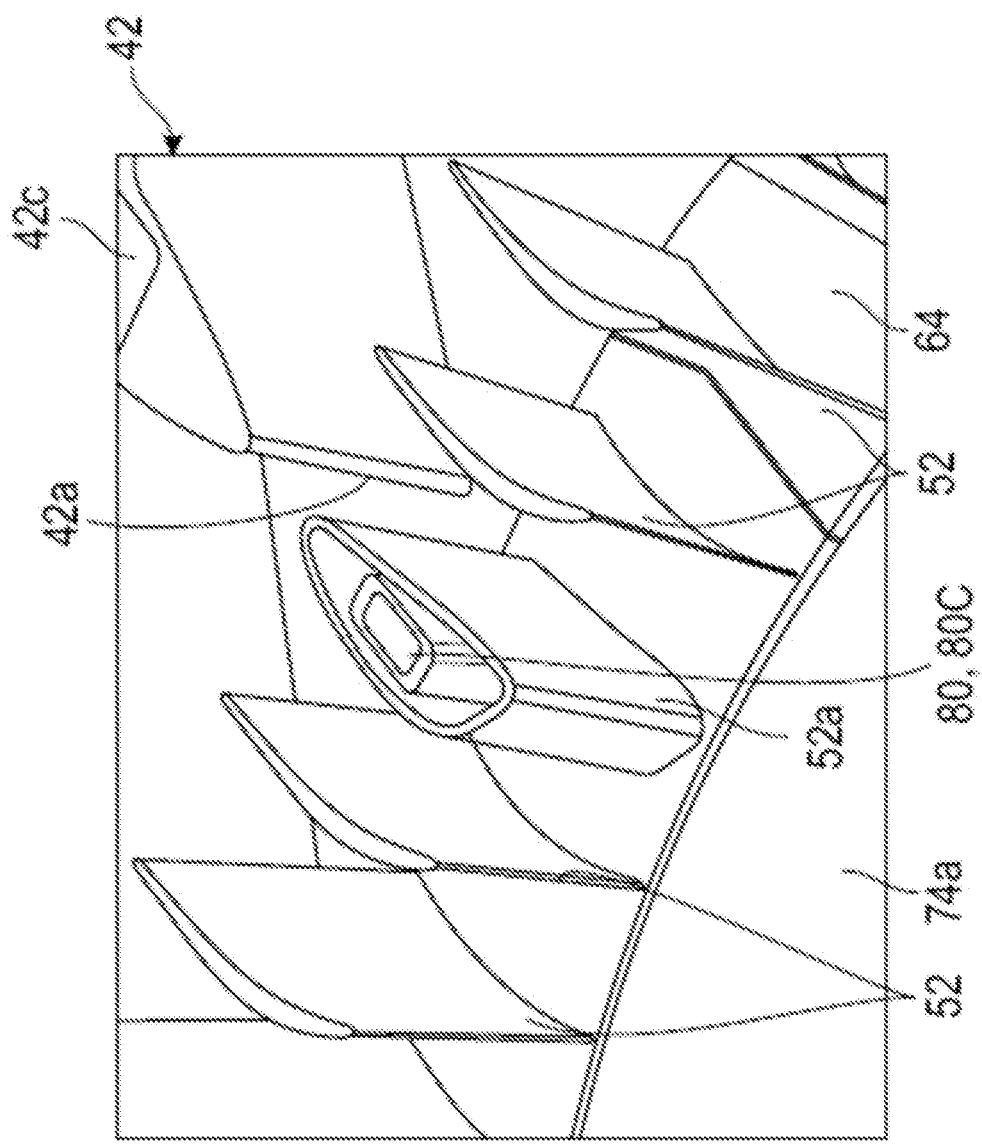
FIG. 8 is a schematic view in perspective and with partial pull-out of a portion of the turbomachine of FIG. 2 and shows in particular the IGV arms, one of which is used for the passage of the electric connection bar.

FIGS. 4 and 8 allow to show that the IGV 52a for the passage of the bar 80 is oversized, this oversizing being essentially due to the presence of the internal cavity of the arm. It is understood that the number of oversized IGV 52a will depend on the number of bars 80 for electric connection of the machine 70 to the circuit 78, each bar 80 passing through one of these oversized arms.

FIGS. 4, 5 and 7 allow to show that the portion 80d of the bar 80 passes through notches 92 of the flanges 43a, 43b. These are axial notches 92 formed at the external periphery of the flanges 43a, 43b for attaching the OGV 44 and shaped so that the bar 80 can run through these notches 92 without interfering with the attachment of the arm 44 to the flanges 43a, 43b. FIG. 5 further allows to show that the end 84b is bent downstream of the flange 43b to be oriented substantially parallel to that flange.

FIGS. 6a to 6d and 7 illustrate steps of a method for maintaining the turbomachine 10.

In the order shown for the steps illustrated in FIGS. 6a to 6d, these steps allow a disassembling of the bar 80. It is understood that it is sufficient to repeat these steps in the reverse order to carry out an assembly or reassembly of the bar 80.

Figure 6A:
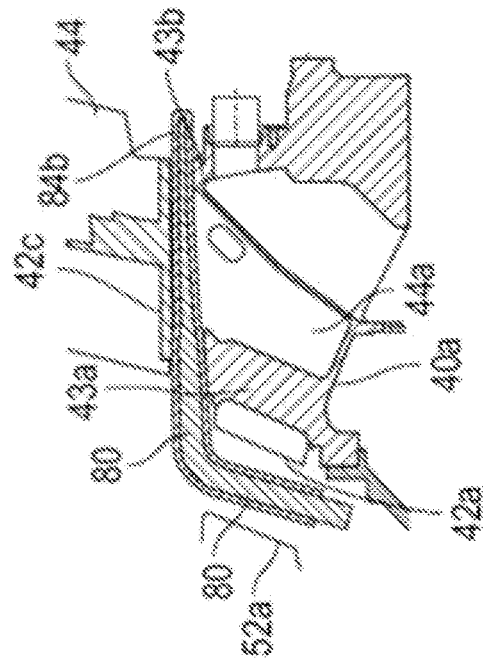
FIGS. 6a to 6d are views of a detail of FIG. 3 and illustrate steps in a method for maintaining the turbomachine.
Figure 6B:
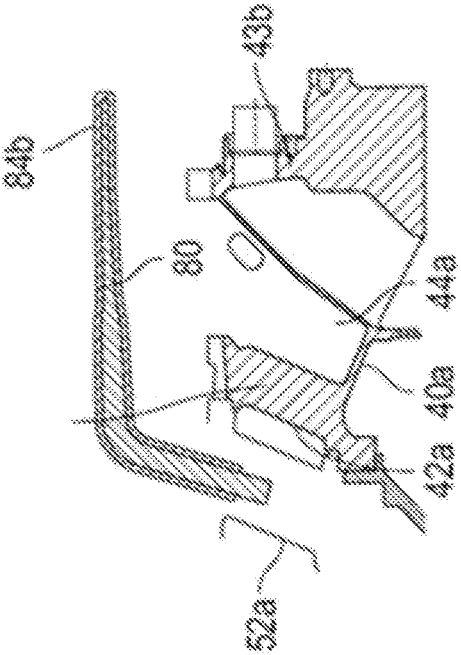

In the first step illustrated in FIGS. 6a and 6b, at least one portion of the third envelope 39 is disassembled and removed, in particular at the level of the bar 80. It is thus a question of disassembling and removing the shroud 68. Advantageously, this shroud 68 is sectorized and only one angular sector of this shroud 68 is removed, as shown in FIGS. 4 and 5. Alternatively, the entire shroud 68 is removed, as shown in FIG. 7.

Figure 6C:
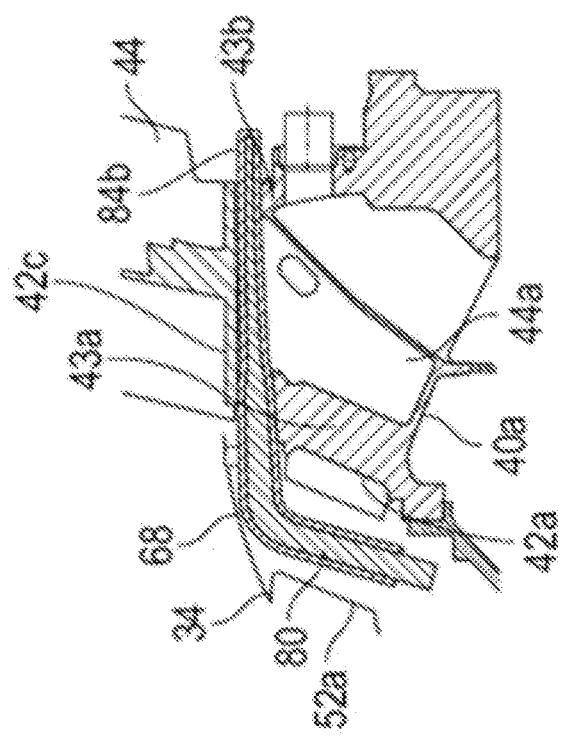

Another step shown in FIGS. 6b and 6c consists in disassembling and removing the OGV 44 located in line with the bar 80. This step is also illustrated in FIG. 7 where one of the OGV 44 is missing.

Figure 6D:
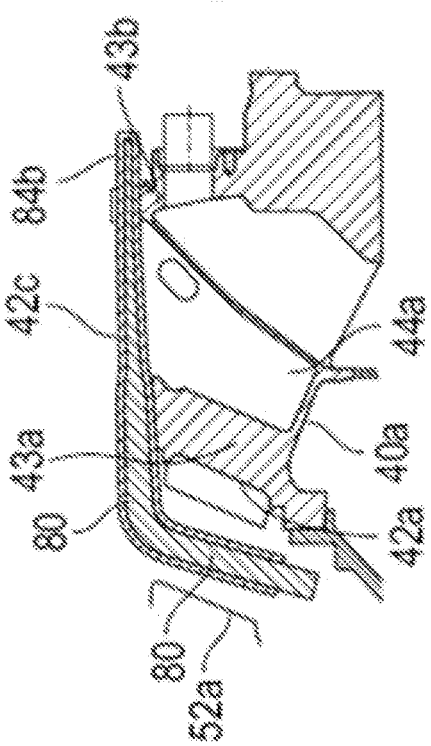

Another step consists then in disengaging the ends 84*a*, 84*b* of the bar from the harnesses 82*c*, 82*d*. The bar 80 is then disassembled and can be removed, as shown in FIGS. 6*d* and 7.

An example of this IGV 52*a* that limits aerodynamic disturbances and interacts with the neighbouring IGV to act as a straightener is shown in FIG. 8, the IGV 52*a* comprises, for example: a leading edge that is axially offset from the trailing edge by a similar offset to a neighbouring IGV 52 and/or an extrados that has a greater camber than a neighbouring IGV 52.

Figure 9:
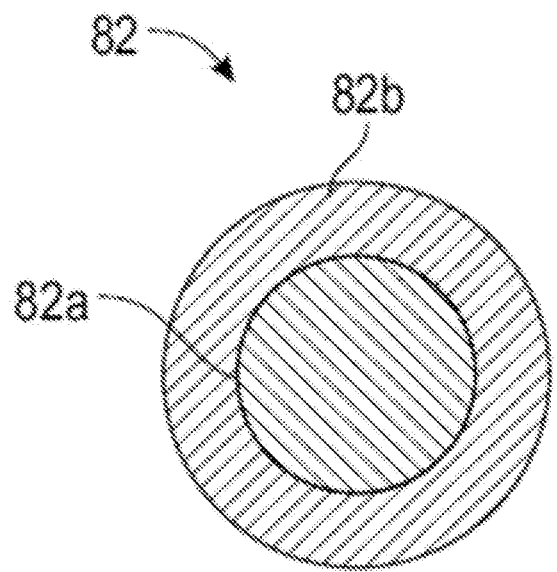
FIG. 9 is a schematic cross-sectional view of an electric harness.
Figure 10:
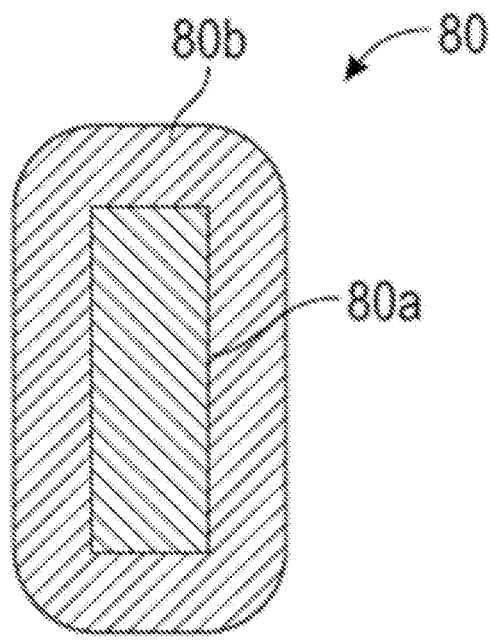
FIG. 10 is a schematic cross-sectional view of an embodiment of an electric connection bar.

FIG. 9 shows a cross-section of an electric harness 82 that is generally circular in shape and comprises a conductive core 82*a* formed by a strand of wires and an insulating external sheath 82*b*. FIG. 10 shows an example of embodiment of a bar 80, which comprises a conductive body 80*a* preferably having a polygonal shape and for example rectangular in cross-section. The bar 80 further comprises an insulating external sheath 80*b*.

The present invention allows to provide many advantages:
the bar 80 allows, contrary to a harness, very short bending radii, which, in the environment in question, is essential; this allows to limit the thickness of the splitter nose 34 to a thickness close to that of the bar 80. The bar 80 has its rectangular cross-section oriented in the plane P2 to have a small radial thickness in the portion 84*b*. The bar 80 is twisted in portion 80*d* at the level of the passage of the inlet casing 40 between two OGV 44 so that in portion 80*c* its rectangular cross-section is oriented according to the plane P1 and has a small transverse thickness and extends in the axial direction and then in the radial direction in its portion 80*c* in order to enter the IGV 52*a*;
the bar 80 is rigid, so there is no risk of vibrations due to too much flexibility and therefore no need for specific support in the arms of the inlet casing 40;
the path described above is compatible with all the oil auxiliaries circulating in the arms of the inlet casing 40; moreover, the walls of the inlet casing 40, and in particular the walls 40*a* and 42*b*, isolate the bar 80 from these oil auxiliaries, which limits the risk of fire; and
the modularity linked to the ease of assembly/disassembly of the bar 80 by removing only a few parts of the turbomachine.

This invention could be applied to any turbomachine equipped with an electric machine upstream of a structural casing such as an inlet casing or other.

The invention claimed is:

1. An aircraft turbomachine, comprising:
a gas generator having a longitudinal axis,
a fan located at an upstream end of the gas generator and configured to rotate about said axis, and
an electric machine having an annular shape mounted coaxially downstream of the fan, and which comprises a rotor rotatably coupled to the fan, and a stator,
the fan configured to generate a main gas flow, a portion of which flows into a primary annular duct of the gas generator to form a primary flow, and another portion of which flows around the gas generator to form a secondary flow,
the primary duct being delimited by first and second annular envelopes coaxial with the gas generator, the primary duct being passed through by bladings, referred to as IGV, configured to connect the first and second envelopes, as well as by tubular arms of an inlet casing located downstream of the IGV arms,
the gas generator comprising a third annular envelope which coaxially surrounds the second envelope, the second and third envelopes being connected together at their upstream ends to form an annular splitter nose that separates the primary and secondary flows,
wherein the stator of the electric machine is connected to a power electronic circuit by at least one rigid electroconductive bar, the bar comprising a first portion extending radially with respect to said axis inside one of the IGV arms, and a second portion extending parallel to said axis between the second and third envelopes.

2. The turbomachine of claim 1, wherein the bar is L-shaped, said first and second portions being straight and connected together by a junction located directly downstream of said splitter nose.

3. The turbomachine of claim 1, wherein the bar has a polygonal and constant cross-section, and can be twisted.

4. The turbomachine according to claim 1, further comprising a nacelle casing that surrounds the gas generator, as well as bladings, referred to as OGV, connecting the nacelle casing to said third annular envelope.

5. The turbomachine according to claim 4, wherein the gas generator comprises annular flanges attaching the OGV which are located between said second and third envelopes and which comprise notches configured for the passage of said second portion of the bar.

6. The turbomachine according to claim 1, wherein the bar is surrounded by an insulating sheath and comprises a first end exposed and configured for releasable attachment to an element for electric connection to said stator, and a second end exposed and configured for releasable attachment to a harness for electric connection to said circuit.

7. The turbomachine according to claim 1, wherein the electric machine is located upstream of said splitter nose.

8. The turbomachine according to claim 1, wherein the stator of the electric machine is connected to the power electronic circuit by a plurality of rigid electroconductive bars regularly distributed around said axis (A).

9. The turbomachine according to claim 1, wherein the IGV through which the bar passes is tubular and oversized relative to the other IGV arms.

10. The turbomachine according to claim 1, wherein said power circuit is located between the second and third envelopes.

11. A method for maintaining a turbomachine according to claim 1, comprising the steps consisting of:
disassembling and removing at least one portion of the third envelope at the level of said bar (80),
disassembling and removing the OGV located in line with the bar, and
disassembling and removing the bar for maintenance.

\* \* \* \* \*